April 18, 1961     P. R. SHEPLER     2,979,955

PRESSURE RESPONSIVE SYSTEMS

Filed April 12, 1957     2 Sheets-Sheet 1

INVENTOR.
PAUL R. SHEPLER

BY *Robert Hochfield*

HIS ATTORNEY

April 18, 1961     P. R. SHEPLER     2,979,955
PRESSURE RESPONSIVE SYSTEMS
Filed April 12, 1957     2 Sheets-Sheet 2
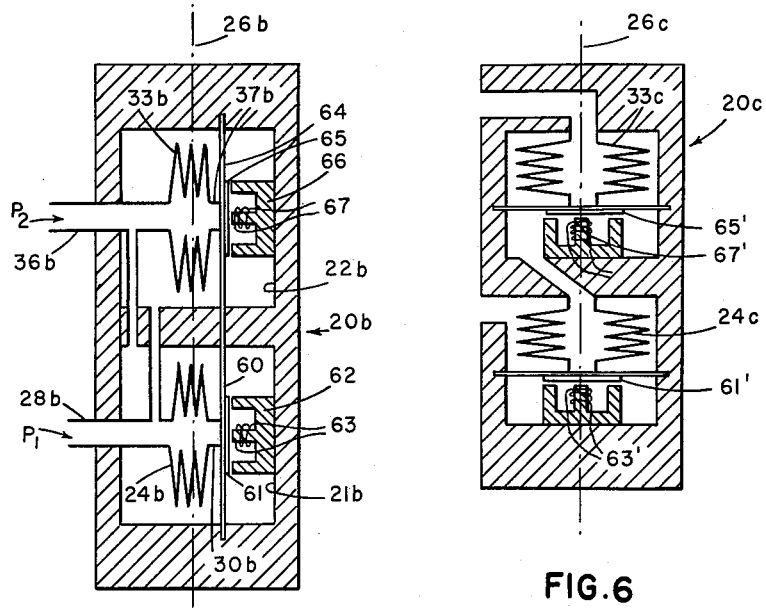
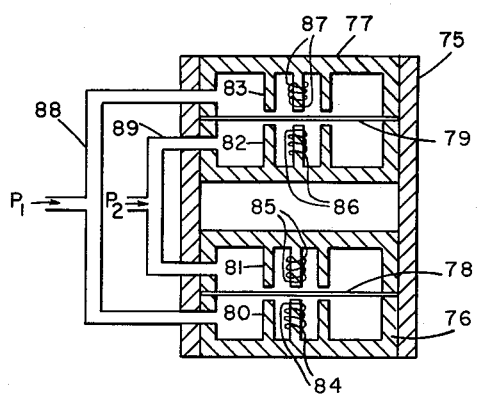
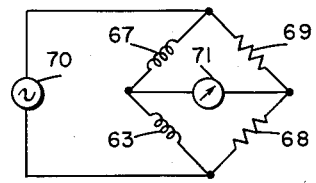
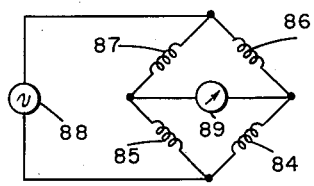
INVENTOR.
PAUL R. SHEPLER
BY Robert Hochfield
HIS ATTORNEY

United States Patent Office 2,979,955
Patented Apr. 18, 1961

2,979,955
PRESSURE RESPONSIVE SYSTEMS

Paul R. Shepler, Houston, Tex., assignor to Schlumberger Well Surveying Corporation, Houston, Tex., a corporation of Texas Filed Apr. 12, 1957, Ser. No. 652,585
4 Claims. (Cl. 73—398)

This invention relates to pressure responsive systems and, more particularly, pertains to a new and improved system for deriving indications in response to relatively small fluid pressures.

Pressure transducers have been employed heretofore in the measurement of fluid flow. In one arrangement, a Venturi tube is used to develop a differential pressure representing rate of flow, and to measure this pressure, the upstream and throat sections of the Venturi tube are connected to pressure transducers in a single unit usually referred to as a differential pressure cell. Such a cell may comprise a thin diaphragm supported between two coil-magnet assemblies so that the inductances of the coils vary according to movement of the diaphragm. Alternatively, the cell may include a bellows mechanically connected to a cantilever on which strain gauges are mounted. The resistances of the strain gauges, of course, vary with displacement of the bellows.

To adapt such devices to the measurement of very low flow rates, the diaphragm must be very thin or the bellows and cantilever must be very sensitive, as the case may be. Thus, although the cell responds to differential pressure, it also responds to effects of gravity, i.e., if the pressure cell is tilted from an initial position, an extraneous signal is produced. Moreover, this signal is dependent upon the amount of tilt. In applications such as the measurement of fluid flow in a well bore where inclination relative to vertical ordinarily is neither zero nor constant, gravity effects can be quite detrimental to accurate flow measurements.

It is therefore an object of the present invention to provide a new and improved pressure responsive system featuring high sensitivity.

A further object of the present invention is to provide a new and improved pressure responsive system in which gravity effects are minimized.

Another object of the present invention is to provide a new and improved pressure responsive system featuring essentially no gravity effects, while providing a differential pressure signal of appreciably larger magnitude than possible with similar prior devices.

Still another object of the present invention is to provide a new and improved pressure responsive system which is substantially nonresponsive to variations in ambient temperature.

A pressure responsive transducing system embodying the present invention comprises a pair of movable pressure-sensitive members having substantially identical pressure versus displacement characteristics. Means are provided for supporting the pressure-sensitive members so as to be substantially identically influenced in one sense relative to each other by effects of gravity and for effecting displacement of the pressure-sensitive members in another sense relative to each other in response to pressure of a fluid under observation. Each of a pair of energy-converting elements is mechanically coupled to one of the pressure-sensitive members and these energy-converting elements or transducers have individual electrical output circuits. The system further comprises means coupled to the electrical output circuits for deriving indications responsive to displacement of the pressure-sensitive members in one sense, substantially to the exclusion of displacement in the other sense.

The pressure-sensitive members may be in the form of diaphragms or bellows and in a specific embodiment of the invention transducers include respective cantilevers provided with resistance type strain gauges.

According to another embodiment of the invention, each transducer includes an armature and coil arrangement. The armature and coil arrangements may be of the single-ended variety or of the balanced type incorporating a pair of coils on opposite sides of an armature.

For the measurement of differential pressure, one pressure is applied to a given side of one pressure-sensitive member and to the opposite side of the other pressure-sensitive member. The other pressure is applied to the remaining sides of the pressure-sensitive members. To measure an unknown pressure, a reference or fixed pressure is utilized as the above-mentioned one pressure while the unknown pressure is utilized as the above-mentioned other pressure.

The novel features of the present invention are set forth with particularity in the appended claims. The present invention, both as to its organization and manner of operation, together with further objects and advantages thereof, may best be understood by reference to the following description taken in connection with the accompanying drawings in which:

Fig. 4 is a view similar to that represented in Fig. 1, but illustrates another embodiment of the invention;

Fig. 5 is a schematic diagram of an electrical circuit for use with the device shown in Fig. 4;

Fig. 6 represents another way of orienting the elements represented in Fig. 4;

Fig. 7 represents a portion of a transducing system featuring still another embodiment of the invention;

Fig. 8 illustrates an electrical circuit for use with the arrangement of Fig. 7.

Figure 1:
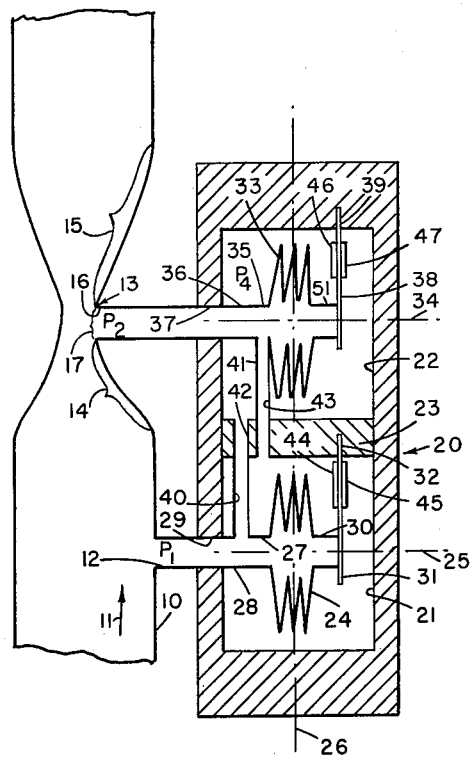
Fig. 1 is a view in longitudinal cross section of a portion of a pressure transducing system embodying the present invention shown in association with a Venturi tube.

As shown in Fig. 1 of the drawings, a pressure responsive system in accordance with the present invention may be employed to provide indications of the rate of flow of fluid passing through a conduit 10 in the direction of arrow 11 by measuring differential pressure. Thus, an opening 12 is provided at the entrance end of a conduit section 13 of reduced diameter, preferably in the form of a Venturi tube. The Venturi tube has an upstream surface 14 of a steeper angle or shorter radius of curvature than downstream portion 15. Differential pressure is measured between entrance opening 12 and an opening 16 in a restricted or throat portion 17. As is well known, the difference between pressure $P_1$ at opening 12 and pressure $P_2$ at opening 16 depends upon the rate of flow of fluid in conduit 10. Of course, any other device for developing such a differential pressure may be employed. For example, a Pitot tube, an orifice plate or the like is suitable.

A pressure responsive system in accordance with the present invention, comprises a fluid-tight housing 20 having a lower cavity 21 and an upper cavity 22 separated from one another in fluid-tight relation by a partition 23. Disposed within lower compartment 21 is a pressure-sensitive element such as a bellows 24 oriented so that its axis 25 is perpendicular to vertical axis 26 of housing 20. At its left-hand end 27, bellows 24 is fluidly and mechanically connected to a tube 28 extending horizontally through an opening 29 in compartment 21. The tube 28 terminates at and is sealed to the wall of opening 12 and it is also sealed to the wall of opening 29 where a mechanical connection is provided thereby fixing the position of bellows end 27. Movable end 30 of the bellows is closed and is secured to a free end portion of a vertically extending cantilever 31 whose upper end 32 is secured to partition 23.

Upper compartment 22 likewise encloses another bellows 33 oriented with its axis 34 perpendicular to vertical axis 26. Left-hand end 35 of bellows 33 is open and is fluidly and mechanically connected to a horizontal tube 36. Tube 36 extends through an opening 37 in the sidewall of compartment 22 where it is mechanically connected and fluidly sealed. It terminates at opening 16 where it is fluidly connected. Movable, right-hand end 51 of the bellows is closed and is connected to thin, vertically extending cantilever 38 whose upper end 39 is secured to an adjacent wall portion of the housing 20.

From the foregoing discussion, it is evident that the interior of bellows 24 is exposed to pressure $P_1$, while the interior of bellows 33 is exposed to pressure $P_2$. By means of conduits 40 and 41, which extend through respective openings 42 and 43 in partition 23 and which are connected to tubes 28 and 36, respectively, the exterior of bellows 33 is exposed to pressure $P_1$ and the exterior of bellows 24 is exposed to pressure $P_2$.

Transducers, such as resistance type strain gauges 44 and 45 are secured to opposite side portions of the cantilever 31, and similar strain gauges 46 and 47 are secured to cantilever 38. The strain gauges may be either bonded in their entirety to their cantilevers or each may be secured at its ends to spaced points. Each strain gauge is positioned at the point of maximum strain of its cantilever, usually referred to as the "root."

Preferably, the bellows 24 and 33 are of identical construction and since they are similarly oriented they are substantially identically influenced in one sense by effects of pressure, gravity, temperature, etc. As will be more evident from the discussion to follow, the bellows are influenced in another sense relative to each other in response to pressure of a fluid under observation. Moreover, the strain constants for the cantilevers 31 and 38 are arranged to be identical so that cantilevers are deflected by the same amount in response to applied forces of the same value. In addition, the gauge factors of all of the strain gauges should be alike; that is, the change in resistance for a given change in length should be the same for all gauges.

Figure 2:
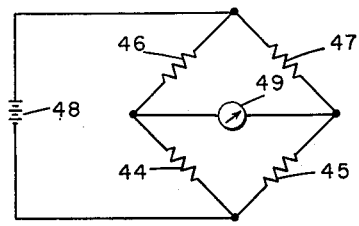
Fig. 2 is a schematic diagram of an electrical circuit for use in connection with the device illustrated in Fig. 1 according to the present invention.

As shown in Fig. 2, electrical output leads of the strain gauges are incorporated in an electrical bridge circuit having one set of opposite apices connected to a source of unidirectional potential such as a battery 48. Connected to the remaining pair of apices is an indicator which may, for example, be a voltmeter 49. The connections in the bridge circuit are such that strain gauge resistances 45 and 46 are in one pair of opposite arms, while strain gauge resistances 44 and 47 are in the remaining pair of opposite arms.

It will be noted that when axis 26 of housing 20 is precisely vertical, no gravity forces are developed either on the cantilevers or the bellows and there are no gravity-induced deflections. Moreover, if no pressures are applied to the bellows, the bellows remain in their quiescent positions represented in Fig. 1, thus producing no deflection of the cantilevers 31 and 38. Consequently, the strain gauge resistances 44–47 remain undistorted and at their quiescent, equal resistance values. The bridge circuit in Fig. 2 remains balanced and thus no indication appears on meter 49.

If equal pressures $P_1$ and $P_2$ are applied, the bellows 24 and 33 cannot expand, because these pressures are applied differentially to the bellows. Under this condition, which represents no movement of fluid through conduit 10, the bridge circuit remains balanced. Accordingly, meter 49 provides an indication of zero flow rate.

Let it now be assumed that fluid flows through conduit 10 in the direction of arrow 11 and that a pressure $P_1$ greater than pressure $P_2$ is developed. Under this condition, bellows 24 expands while bellows 33 is contracted. Cantilever 31 is deflected to the right thereby changing the resistance values of strain gauges 44 and 45 in opposite senses and cantilever 38 is deflected to the left thus changing the resistance values of strain gauges 46 and 47 in opposite senses, but in reverse relation to the changes produced in the other set of strain gauges. In other words, the resistance values of strain gauges 45 and 46 in the bridge circuit of Fig. 2 vary in the same sense while the resistance values of strain gauges 44 and 47 also vary in the same sense, but this change is opposite to the change in the first-mentioned pair. This, of course, produces an unbalance in the bridge circuit which is represented by a voltage indicated on meter 49. It is evident that the amount of deflection of the bellows 24 and 33 is dependent upon the differential pressures $P_2 - P_1$ and meter 49 provides an accompanying indication of the amount of differential pressure. As pointed out above, the differential pressure depends upon the rate of flow of fluid in conduit 10 and thus meter 49 provides indications denoting the flow rate and may be appropriately calibrated for this purpose.

The signal obtained by the pressure responsive system of Figs. 1 and 2 in the illustrated environment is a differential pressure signal. Furthermore, this signal is twice as large as that produced in any prior arrangements incorporating a single bellows and cantilever.

As pointed out above, when axis 26 is precisely vertical, there is no deflection of cantilevers 31 and 38, in the absence of a differential pressure, and the bridge circuit of Fig. 2 remains balanced. Let it now be assumed that housing 20 is tilted, say counterclockwise. Because of the effects of gravity, each of the bellows 24 and 33 contracts and each of the cantilevers 31 and 38 is flexed to the left. This causes the resistance values of strain gauges 44 and 46 to change equally and in the same sense, while strain gauge resistances 45 and 47 vary in the opposite sense. Since the spring constants of both systems have been matched, the unit strain of each cantilever is the same since both units have been tipped or tilted by equal amounts. Moreover, since the gauge factors of all strain gauges are the same, the change in resistance of every gauge is the same numerically, although not algebraically. Therefore, the bridge circuit in Fig. 2 remains balanced. It may likewise be shown that when housing 20 is tipped in the other direction, the bridge circuit also remains balanced.

From the foregoing discussion, it is evident that a pressure responsive system embodying the present invention provides indications resulting from displacement of the bellows in the aforesaid one sense, but not in response to displacement in the other sense. In other words, pressure indications are derived, but there are no indications caused by extraneous effects.

Since both systems are identical, any changes resulting from variations in ambient temperature producing a deflection of the cantilevers or a variation in the resistance values of the strain gauges will be identical. From the foregoing analysis of the effects of gravity, it is evident that the pressure responsive system embodying the present invention is not only free of gravity effects, but is substantially nonresponsive to variations in ambient temperature. Therefore, a considerable improvement over prior arrangements is achieved.

Inasmuch as extraneous effects are minimized, if not altogether eliminated, the components may be freed of design requirements imposed by such effects. Consequently, a pressure responsive system embodying the present invention may be designed to provide greater sensitivity and to indicate lower pressures than heretofore possible.

Figure 3:
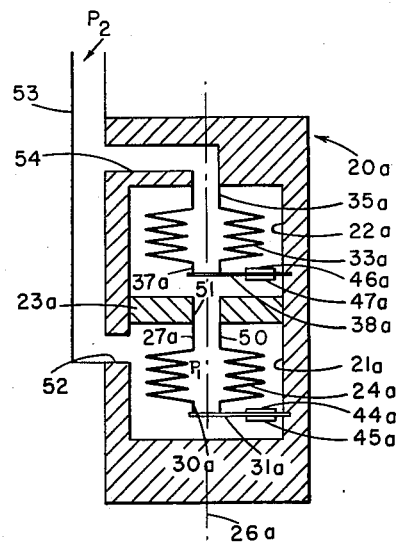
Fig. 3 illustrates another way in which the elements represented in Fig. 1 may be oriented.

In the modified arrangement illustrated in Fig. 3, elements whose counterparts appear in Fig. 1 are represented by the same reference numerals followed by the letter "a." Housing 20a is provided with cavities 21a and 22a separated by partition 23a. The bellows 24a and 33a, however, are oriented with their axes in alignment with longitudinal axis 26a of the housing 20a. Lower ends 30a and 37a of the bellows 24a and 33a are closed and are connected to respective cantilevers 31a and 38a. Strain gauges 44a and 45a are provided for cantilever 31a, while strain gauges 46a and 47a are associated with cantilever 38a. The upper, open end 27a of bellows 24a is connected by a tube 50 to compartment 22a; the tube passes through an opening 51 in partition 23a to which it is fluidly sealed. It is thus evident that pressure $P_1$ is a static or reference pressure which remains fixed and the interior of bellows 24a and the exterior of bellows 33a are exposed to this pressure.

An opening 52 in compartment 21a is connected by a conduit 53 to a conduit 54 which is fluidly coupled to the open, upper end 35a of bellows 33a. Thus, pressure $P_2$ which may be applied to conduit 53 is applied to the exterior of bellows 24a and to the interior of bellows 33a.

Although the bellows and cantilevers illustrated in Fig. 3 are oriented 90° relative to the orientation of their counterparts in Fig. 1, it is evident that the same advantages considering gravity and temperature effects are achieved. However, the bridge circuit of Fig. 2 when associated with the arrangement of Fig. 3 may be used to provide indications representing the absolute value of pressure $P_2$ rather than differential pressure.

Of course, the device of Fig. 3 may be appropriately arranged to provide differential pressure indications in a manner similar to the arrangement of Fig. 1, whereas the device in Fig. 1 may be suitably rearranged to provide absolute pressure indications.

It will be noted that both of the units shown in Figs. 1 and 3 can be housed in long cylindrical tubes. Accordingly, each is well suited for use in apparatus adapted to be passed through a well or borehole. For example, the arrangement of Fig. 1 may be installed in a flowmeter adapted to be used in the measurement of gas velocity in gas wells. In such an application, it is evident that the transducers and the pressure sensitive members, i.e. the bellows, continually experience movement. They rotate about the axis of the cable usually used to support the device in the well bore and, of course, the bore is commonly off vertical, thus tending to produce extraneous indications in prior pressure responsive systems. However, as explained hereinbefore, the system embodying the present invention is entirely free of the results of such influences.

In the embodiment of the invention illustrated in Fig. 4, housing 20b includes compartments 21b and 22b enclosing bellows 24b and 33b. Instead of using cantilevers and strain gauges, variable reluctance devices are employed to convert mechanical displacement to an electrical signal.

Accordingly, the closed end 30b of bellows 24b is connected to the center of a thin diaphragm-like member 60 which is secured to an armature 61 constructed of a ferromagnetic material. The armature 61 is associated with an E-shaped core 62 of ferromagnetic material provided with a coil 63 on its central leg. The free end 37b of bellows 33b similarly is secured to the center of a diaphragm-like member 64 which carries a ferromagnetic member or armature 65. The armature is associated with an E-shaped core 66 which carries a coil 67 on its central leg.

As shown in Fig. 5, coils 63 and 67 are connected in adjacent arms of an electrical bridge circuit having fixed resistances 68 and 69 in the remaining adjacent arms. Opposite apices of the bridge are connected to a source 70 of alternating potential and the remaining apices are connected to a voltmeter 71 adapted to provide indications of alternating potential.

Since the bellows arrangement is the same as the one represented in Fig. 1, it is evident that the ends 30b and 37b of the bellows 24b and 33b experience the same sort of deflection described in connection with Fig. 1. Moreover, the inductance of each of the coils 63 and 67 is dependent upon the position of the associated one of armatures 61 and 65.

In response to a differential pressure, the inductances vary in the opposite sense while under gravity or temperature influences, they vary in the same direction. Thus, meter 71 provides indications of differential pressure. If it is assumed that the inductances are perfectly matched, then the net effect of gravity or temperature changes is zero and the advantages ascribed to the arrangement of Fig. 1 are achieved.

In Fig. 6, a variable reluctance type unit similar to the one shown in Fig. 4 is illustrated. Instead of the bellows being oriented perpendicularly to the axis of the housing, in the modified device bellows 24c and bellows 33c are oriented with their axes in alignment with axis 26c of housing 20c. Coils 63' and 67' are similarly aligned and armatures 61' and 65' move along axis 26c.

In Fig. 7 a balanced type of variable reluctance unit is illustrated. A support 75 is provided for lower and upper fluid-tight housings 76 and 77, each of which is divided into lower and upper compartments by a respective one of thin, horizontal diaphragms 78 and 79. The central portion of each diaphragm is constructed of a ferromagnetic material and E-shaped ferromagnetic cores 80, 81 and 82, 83 are supported on opposite sides of each of the diaphragms. The central leg of the several cores carry a respective one of coils 84, 85, 86 and 87, all of which are in vertical alignment.

A tube 88 and various extensions thereof is provided for supplying fluid pressure $P_1$ to the lower side of diaphragm 78 and to the upper side of diaphragm 79, while a tube 89 and its extensions is employed to apply pressure $P_2$ to the upper side of diaphragm 78 and to the lower side of diaphragm 79.

As shown in Fig. 8 the coils 84–87 are incorporated in an electrical bridge circuit energized by a source 88 of alternating potential and provided with an alternating potential voltmeter 89.

It is evident that a differential pressure causes the diaphragms to move in opposite directions thus effecting an indication at meter 89 dependent upon the amount of differential pressure. If the inductances are initially chosen to be equal, under gravity the diaphragms all act in the same direction and there is no output from the bridge. Similarly, for a temperature change the inductance changes are all equal and there is no indication at meter 89.

If desired, only one of each of the coil sets 84, 85 and 86, 87 may be used. For example, coils 85 and 87 may be incorporated in a bridge circuit similar to the one represented in Fig. 5 provided with balance resistors 68 and 69. The remaining coils are not utilized.

Figure 9:
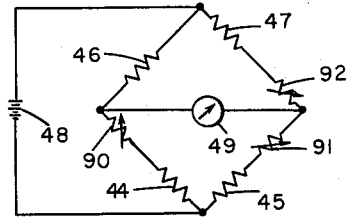
Fig. 9 is a schematic diagram of an electrical circuit which may be used as an alternative to the one shown in Fig. 2.

To assist in balancing the bridge circuit illustrated in Fig. 2, one or more balancing resistors may be employed. For example, as shown in Fig. 9, variable balancing resistors 90, 91 and 92 may be inserted in the arms of the bridge containing strain gauge resistances 44, 45 and 47, respectively. To balance the system, assuming the device of Fig. 1 is employed, housing 20 is oriented vertically and resistor 92 is varied to balance the bridge.

Housing 20 then is tilted to a horizontal position and resistances 90 and 91 are adjusted to balance the bridge again. The foregoing procedure may then be repeated to verify the balance. If desired, after a balance is obtained, the variable resistors 90, 91 and 92 may be measured to determine their resistance values and replaced by fixed resistors having identical values.

Obviously, the method of balancing described in connection with Fig. 9 may be employed in balancing the bridge circuits of either Figs. 5 or 8.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A pressure responsive system comprising: a housing having a pair of fluid-tight compartments; a pair of pressure-sensitive bellows having substantially identical pressure versus displacement characteristics supported in individual ones of said compartments with their axes of expansion parallel to one another so as to be substantially identically influenced in one sense by effects of gravity and other extraneous forces; means for applying a first fluid pressure to the interior of one of said bellows and to the exterior of the other of said bellows and for applying a second fluid pressure to the interior of said other bellows and to the exterior of said one bellows to effect displacement of said bellows in another sense relative to each other in response to the differential between said first and said second fluid pressures; a pair of thin, flat deformable members suspended in individual ones of said compartments with their principal surfaces parallel to one another and perpendicular to said bellows axes, a suspended portion of each member being coupled to a movable portion of the corresponding bellows; a pair of electrical elements located in individual ones of said compartments and coupled to the corresponding deformable member so that deformation of such member will alter the electrical characteristics of the corresponding electrical element; and circuit means coupled to said electrical elements for deriving indications responsive to displacement of said pressure-sensitive bellows in said other sense substantially to the exclusion of displacement in said one sense.

2. A pressure responsive system comprising: a housing having a pair of fluid-tight compartments; a pair of pressure-sensitive bellows having substantially identical pressure versus displacement characteristics; means for mounting said pressure-sensitive bellows in individual ones of said compartments with their axes of expansion parallel to one another so as to be substantially identically influenced in one sense by effects of gravity and other extraneous forces; means for applying a first fluid pressure to the interior of one of said bellows and to the exterior of the other of said bellows and for applying a second fluid pressure to the interior of said other bellows and to the exterior of said one bellows for effecting displacement of said pressure-sensitive members in another sense relative to each other in response to the differential between said first and second fluid pressures; a pair of cantilever beams located in individual ones of said compartments with each having one of its ends fixed and its remaining end mechanically coupled to a corresponding end of the respective one of said bellows, said cantilever beams being mounted with their longitudinal axes parallel to one another and perpendicular to said bellows axes; a pair of strain gauges individually mechanically coupled to a different one of said cantilever beams; and means coupled to said strain gauges for deriving indications responsive to displacement of said pressure-sensitive bellows in said other sense substantially to the exclusion of displacement in said one sense.

3. A highly-sensitive pressure measuring device for measuring fluid pressures comprising: a fluid-tight housing having an internal fluid-impermeable partition dividing the housing into a pair of fluid-tight compartments; a pair of thin, highly-flexible cantilever beams located in individual ones of the compartments with one end of each cantilever beam fixed to a corresponding wall of each compartment with the beams extending inwardly into the compartments in parallel directions; a pair of highly-flexible, pressure-sensitive bellows supported in individual ones of the compartments with their axes of expension parallel to one another and perpendicular to the cantilever beam axes, corresponding ends of each bellows being secured to a corresponding wall of each compartment, the other end of each bellows being closed and secured to the free end of the corresponding cantilever beam; means for applying a first fluid pressure to the interior of one of the bellows and to the exterior of the other of the bellows; means for applying a second fluid pressure to the interior of the other bellows and to the exterior of the one bellows; a pair of resistance strain gauges individually secured to opposite sides of each cantilever beam at the root thereof; and means electrically connecting the strain gauges into a bridge circuit for deriving electrical indications representative of any difference in the first and second fluid pressures while providing substantially no indication as a result of undesired extraneous deflections of the cantilever beams.

4. A pressure responsive system comprising: a housing having a pair of fluid-tight compartments; a pair of pressure-sensitive bellows having substantially identical pressure versus displacement characteristics supported in individual ones of said compartments with their axes of expansion parallel to one another so as to be substantially identically influenced in one sense by effects of gravity and other extraneous forces; means for applying a first fluid pressure to the interior of one of said bellows and to the exterior of the other of said bellows and for applying a second fluid pressure to the interior of said other bellows and to the exterior of said one bellows to effect displacement of said bellows in another sense relative to each other in response to the differential between said first and said second fluid pressures; a pair of thin, flat diaphragms suspended in individual ones of said compartments with their principal surfaces parallel to one another and perpendicular to said bellows axes, a suspended portion of each diaphragm being coupled to a movable portion of the corresponding bellows; a pair of variable inductance elements located in individual ones of said compartments and individually including an armature coupled to the corresponding diaphragm and an inductance coil supported in proximity thereto so that deformation of the diaphragm will alter the inductance characteristic of the coil; and circuit means coupled to said inductance coils for deriving indications responsive to displacement of said pressure-sensitive bellows in said other sense substantially to the exclusion of displacement in said one sense.

References Cited in the file of this patent

UNITED STATES PATENTS

| | | |
|---|---|---|
| 2,266,608 | Kuehni | Dec. 16, 1941 |
| 2,442,938 | Ruge | June 8, 1948 |
| 2,460,076 | Emerson | Jan. 25, 1949 |
| 2,539,892 | Cook | Jan. 30, 1951 |
| 2,602,329 | Clark | July 8, 1952 |
| 2,641,742 | Wolfe et al. | June 9, 1953 |
| 2,683,989 | Clark | July 20, 1954 |
| 2,737,051 | Sanderson | Mar. 6, 1956 |
| 2,772,569 | Ruge | Dec. 4, 1956 |
| 2,784,593 | Peucker | Mar. 12, 1957 |

FOREIGN PATENTS

| | | |
|---|---|---|
| 1,097,349 | France | Feb. 16, 1955 |
| 1,126,505 | France | July 30, 1956 |